United States Patent
Dopke et al.

(10) Patent No.: US 7,757,674 B2
(45) Date of Patent: *Jul. 20, 2010

(54) INTAKE AIR AND CARBURETOR HEATING ARRANGEMENT FOR V-TWIN ENGINES

(75) Inventors: Russell J. Dopke, Elkhart Lake, WI (US); David R. Brower, Beaver Dam, WI (US); Scot A. Koehler, Appleton, WI (US); Gary L. Stenz, Mt. Calvary, WI (US); Clyde R. Wetor, Cascade, WI (US); Steven T. Davis, Green Bay, WI (US); Randall E. Sterr, North Fond du Lac, WI (US)

(73) Assignee: Certified Parts Corporation, Janesville, WI (US)

( * ) Notice: Subject to any disclaimer, the term of this patent is extended or adjusted under 35 U.S.C. 154(b) by 40 days.

This patent is subject to a terminal disclaimer.

(21) Appl. No.: 12/133,862

(22) Filed: Jun. 5, 2008

(65) Prior Publication Data

US 2008/0296790 A1 Dec. 4, 2008

Related U.S. Application Data

(60) Continuation of application No. 11/874,517, filed on Oct. 18, 2007, now Pat. No. 7,475,657, which is a continuation of application No. 11/457,951, filed on Jul. 17, 2006, now Pat. No. 7,284,508, which is a division of application No. 10/813,202, filed on Mar. 30, 2004, now abandoned.

(60) Provisional application No. 60/461,266, filed on Apr. 8, 2003.

(51) Int. Cl.
*F02M 31/08* (2006.01)

(52) U.S. Cl. .................................................. 123/556

(58) Field of Classification Search ..... 123/41.56–41.7, 123/556
See application file for complete search history.

(56) References Cited

U.S. PATENT DOCUMENTS 1,131,016 A 3/1915 Thornton et al.

(Continued)

FOREIGN PATENT DOCUMENTS

EP 1 079 025 2/2001

(Continued)

OTHER PUBLICATIONS

European Search Report dated Aug. 9, 2007 in corresponding application No. EP 04 00 8397.

(Continued)

*Primary Examiner*—M. McMahon
(74) *Attorney, Agent, or Firm*—Boyle Fredrickson, S.C.

(57) ABSTRACT

A V-twin engine having a crankcase and a pair of cylinders defining a V-space therebetween, wherein the V-space is substantially enclosed, and a carburetor is positioned within the V-space. An intake air preheating arrangement supplies heated intake air to the carburetor, and a carburetor heating arrangement heats the V-space and the carburetor which is positioned within the V-space. Each of the foregoing arrangements, used separately or in combination within one another, aids in preventing "freeze-up" of the carburetor during running of the engine in a cold environment.

8 Claims, 4 Drawing Sheets

U.S. PATENT DOCUMENTS

| | | | |
|---|---|---|---|
| 1,434,445 | A | 11/1922 | Lind |
| 1,933,365 | A | 10/1933 | Chandler et al. |
| 2,334,561 | A | 11/1943 | Kopplin |
| 2,525,374 | A | 10/1950 | Ruzicka |
| 2,571,828 | A | 10/1951 | Brezek |
| 3,245,390 | A | 4/1966 | Roorda et al. |
| 3,498,280 | A | 3/1970 | Zimmerer et al. |
| 3,500,806 | A | 3/1970 | Sarto et al. |
| 3,565,007 | A | 2/1971 | Tyburski |
| 3,678,973 | A | 7/1972 | Loop |
| 3,881,452 | A | 5/1975 | Dilworth et al. |
| 3,990,421 | A | 11/1976 | Grainger |
| 4,103,656 | A | 8/1978 | Reddekopp |
| 4,142,502 | A | 3/1979 | Nakano et al. |
| 4,294,027 | A | 10/1981 | Edwards |
| 4,312,318 | A | 1/1982 | Davis et al. |
| 4,520,787 | A | 6/1985 | Midorikawa |
| 4,535,746 | A | 8/1985 | Otani et al. |
| 4,691,681 | A | 9/1987 | Hoppner et al. |
| 4,716,860 | A | 1/1988 | Henriksson et al. |
| 4,765,282 | A | 8/1988 | Nagashima |
| 4,841,920 | A | 6/1989 | Andreasson et al. |
| 4,846,136 | A | 7/1989 | Phillips |
| 4,848,294 | A | 7/1989 | Yamamoto |
| 4,890,595 | A | 1/1990 | Fischer |
| 5,076,247 | A | 12/1991 | Schmidt et al. |
| 5,174,258 | A | 12/1992 | Tanaka |
| 6,378,467 | B1 | 4/2002 | Kobayashi et al. |
| 6,427,364 | B1 * | 8/2002 | Heismann et al. ............. 37/219 |
| 6,615,790 | B2 | 9/2003 | Andersson et al. |
| 6,779,514 | B2 | 8/2004 | Zimmermann et al. |
| 6,807,954 | B2 | 10/2004 | Nara et al. |
| 7,284,508 | B2 * | 10/2007 | Dopke et al. ............. 123/41.56 |
| 7,475,657 | B2 * | 1/2009 | Dopke et al. ............. 123/41.56 |

FOREIGN PATENT DOCUMENTS

| | | |
|---|---|---|
| FR | 872.597 | 6/1942 |
| JP | 2-211370 | 8/1990 |
| JP | 8-151921 | 6/1996 |
| JP | 11-93663 | 4/1999 |
| JP | 2003-56408 | 2/2003 |

OTHER PUBLICATIONS

European Search Report dated Apr. 13, 2007 in corresponding application No. EP 04 00 8397.

* cited by examiner

INTAKE AIR AND CARBURETOR HEATING ARRANGEMENT FOR V-TWIN ENGINES

CROSS REFERENCE TO RELATED APPLICATIONS

This application is a continuation of U.S. patent application Ser. No. 11/874,517, entitled INTAKE AIR AND CARBURETOR HEATING ARRANGEMENTS FOR V-TWIN ENGINES, filed Oct. 18, 2007 now U.S. Pat. No. 7,475,657, which is a continuation of U.S. patent application Ser. No. 11/457,951, entitled INTAKE AIR AND CARBURETOR HEATING ARRANGEMENT FOR V-TWIN ENGINES, filed Jul. 17, 2006 now U.S. Pat. No. 7,284,508, which is a division of U.S. patent application Ser. No. 10/813,202, entitled INTAKE AIR AND CARBURETOR HEATING ARRANGEMENTS FOR V-TWIN ENGINES, filed on Mar. 30, 2004 now abandoned, which claims the benefit under Title 35, U.S.C. §119(e) of U.S. Provisional Patent Application Ser. No. 60/461,266, entitled INTAKE AIR AND CARBURETOR HEATING ARRANGEMENT FOR V-TWIN ENGINES, filed on Apr. 8, 2003. The disclosure of the foregoing references are each hereby incorporated by reference herein.

BACKGROUND OF THE INVENTION

1. Field of the Invention

This invention relates to small internal combustion engines of the type commonly used in lawn mowers, lawn and garden tractors, snow throwers, other working implements, or in sport vehicles. In particular, the present invention relates to heating the intake air and the carburetors of such engines.

2. Description of the Related Art

Small internal combustion engines typically include a carburetor which mixes ambient atmospheric air with liquid fuel to provide an air/fuel mixture for combustion within the engine. Usually, the intake air is drawn from the atmosphere through an air filter to remove dirt and other debris from the intake air before the intake air enters the carburetor. A potential problem in such arrangements is that when the engine is used in a cold environment, such as in a snow thrower application, the intake air is often cold and moist, and may include snow. The moisture in the cold intake air may freeze and accumulate within the carburetor, causing the carburetor to "freeze up" and inhibit good engine performance.

It is known to provide small single cylinder engines with duct arrangements which are disposed near the engine muffler. In operation, the duct is heated by radiant heat from the muffler during running of the engine. Air is drawn through the duct by the carburetor, and the air is heated before it enters the carburetor. However, such ducts are typically formed from two or more separate components which fit together and cooperate to define the duct, and therefore, multiple parts are required.

A further problem in many small engines is that the carburetor itself is often positioned in a manner in which it is exposed to the cold environment, potentially leading to carburetor "freeze up". For example, the carburetor may be positioned on one side of the engine in such a manner that at least a portion of the body of the carburetor is disposed externally of the engine enclosure structure and is exposed to the environment.

What is needed is an intake air and/or carburetor heating arrangement for small internal combustion engines which is an improvement over the foregoing.

Also, intake air and/or carburetor heating arrangements which are adapted for use with V-twin engines are not known, thus, a further need is for an intake air and/or carburetor heating arrangement for a V-twin engine.

SUMMARY OF THE INVENTION

The present invention provides an apparatus and method for heating the intake air which is drawn into the carburetor of a V-twin engine, as well as an apparatus and method for heating the carburetor of a V-twin engine.

In a V-twin engine having a crankcase and a pair of cylinders attached to the crankcase and defining a V-space between the cylinders, a heater box is attached to one of the cylinders proximate the exhaust port of the cylinder. The heater box is connected to the air cleaner cavity of the engine via an insulated conduit. During operation of the engine, intake air is drawn from externally of the engine through an opening in the cylinder wrap which surrounds the cylinder, and the air is heated as it passes near the exhaust port of the cylinder and into the heater box. Additionally, a portion of the cooling air from the flywheel/blower of the engine is directed between the cylinder and the cylinder wrap, around the exhaust port of the cylinder, and into the heater box. The air which enters the heater box is heated within the heater box, and then passes through the insulated conduit into the air cleaner cavity and thereafter into the carburetor. Thus, intake air, drawn from the foregoing two sources, is heated before it is drawn through the carburetor and into the engine.

Additionally, a structure for heating the carburetor itself is provided. The carburetor is disposed in the V-space between the engine cylinders, and the V-space is substantially enclosed by the engine shroud, fuel tank, and a wall portion of a duct structure. Air from the flywheel of the engine passes between a cylinder wrap and a cylinder of the engine, and through an opening in the cylinder wrap into the duct structure. Passage of the air through the opening in the duct structure creates a suction or "venturi effect" with which draws an additional portion of heated air into the duct structure from an air space between the muffler and the cylinder wrap. The heated air passes into the V-space to warm the V-space, thus warming the carburetor which is positioned within the V-space.

Advantageously, the foregoing arrangement provides an apparatus and method for heating the intake air which is drawn into the engine to prevent "freeze-up" of the carburetor when the engine is used in a cold environment. Additionally, the foregoing arrangement provides an apparatus and method of heating the carburetor itself to further prevent "freeze-up" of the carburetor, in which warmed air is directed to a substantially enclosed V-space between the engine cylinders in which the carburetor is positioned.

In one form thereof, the present invention provides an internal combustion engine, including a crankcase having a crankshaft rotatably disposed therein; a blower driven by the crankshaft to generate an air stream; a pair of first and second cylinders connected to the crankcase; an air intake system in fluid communication with the cylinders; and an intake air heating arrangement, including a heater box disposed proximate the first cylinder, an interior of the heater box in airflow communication with the air stream; and a conduit in airflow communication with the heater box and with the air intake system, whereby air from the air stream is heated within the heater box and is conducted through the conduit into the intake system of the engine.

In another form thereof, the present invention provides a method of heating intake air in an engine which includes a pair of cylinders disposed at an angle with respect to one another to define a V-space therebetween, the method including the steps of generating an air stream; conducting the air stream proximate a hot portion of the engine to heat air within the air stream; capturing heated air from the air stream in a heater box; and conducting heated air from the heater box to an intake system of the engine.

In another form thereof, the present invention provides an internal combustion engine, including a crankcase having a crankshaft rotatably disposed therein; a blower driven by the crankshaft to generate an air stream; a pair of cylinders connected to the crankcase, the cylinders disposed at an angle with respect to one another to define a V-space therebetween, the V-space substantially enclosed by portions of the engine; a carburetor disposed within the V-space; and a duct assembly disposed proximate at least one of the cylinders and in airflow communication with the air stream and with the V-space, whereby air in the air stream is heated within the duct assembly and is conducted to the V-space to heat the carburetor.

In another form thereof, the present invention provides a method of heating a carburetor of an engine having a pair of cylinders which are disposed at an angle with respect to one another, the method including the steps of generating an air stream; conducting the air stream proximate a hot portion of the engine to heat air within the air stream; and conducting heated air from the air stream into a substantially enclosed V-space defined between the cylinders, in which the carburetor is positioned.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrates preferred embodiments of the invention, and such exemplifications are not to be construed as limiting the scope of the invention any manner.

DETAILED DESCRIPTION

Figure 1:
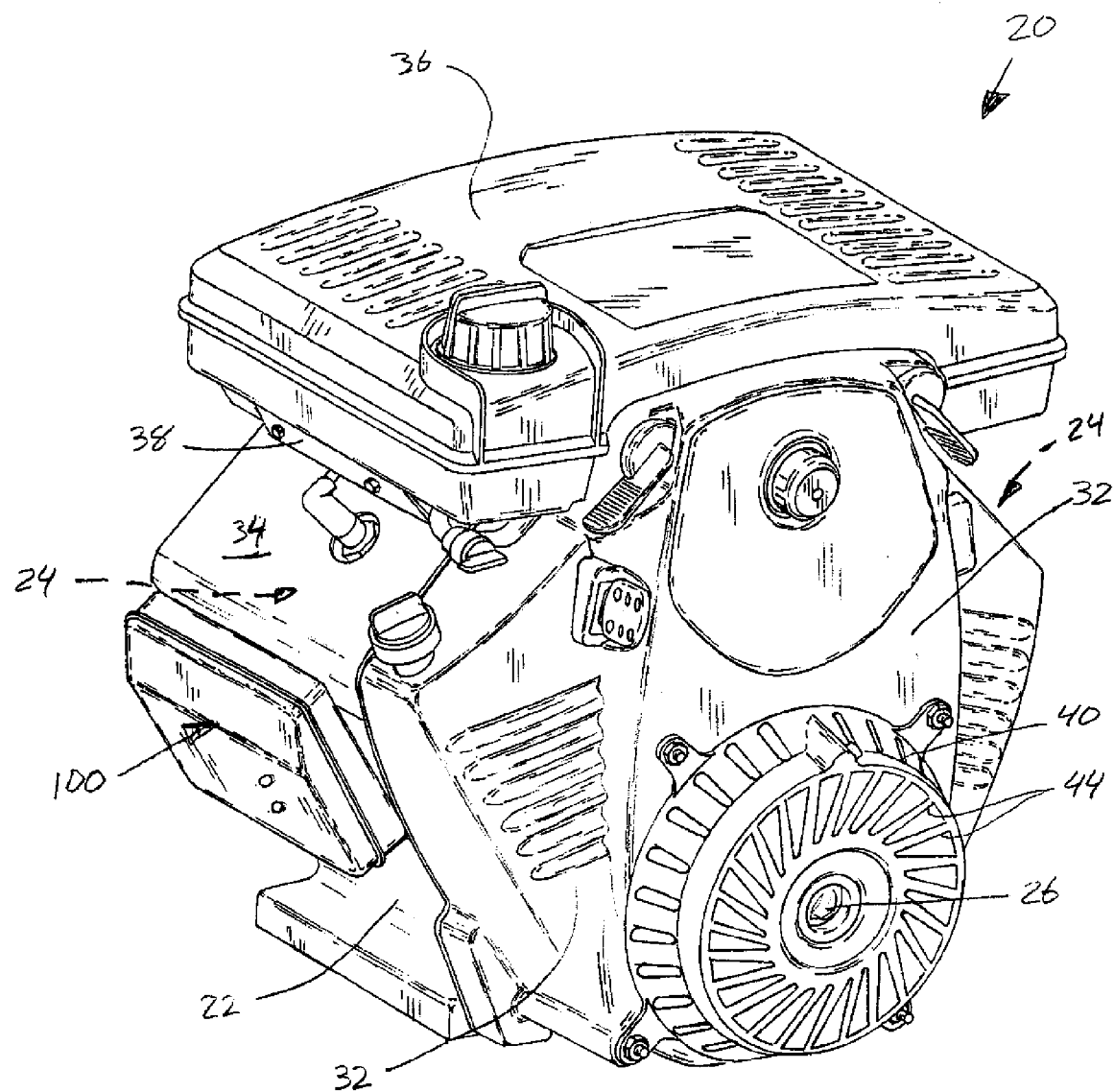
FIG. 1 is a front perspective view of a horizontal crankshaft, V-twin engine including intake air and carburetor heating arrangements in accordance with the present invention.

Referring first to FIG. 1, a small internal combustion engine 20 is shown as a horizontal crankshaft V-twin engine, such as the engine which is described in detail in U.S. patent application Ser. No. 10/409,262, entitled INTERNAL COMBUSTION ENGINE, filed on Apr. 8, 2003, assigned to the assignee of the present invention, the disclosure of which is expressly incorporated herein by reference. Although engine 20 is shown as a horizontal crankshaft V-twin engine which may advantageously be used in a snow thrower, for example, the carburetor and intake air heating concepts of the present invention also could be embodied in vertical crankshaft V-twin engines.

Engine 20 generally includes crankcase 22 having a pair of engine cylinders 24 mounted to crankcase 22 in the manner described in the above-incorporated U.S. patent application Ser. No. 10/409,262. A horizontally disposed crankshaft 26 is rotatably carried within crankcase 22, and is coupled to a pair of conventional piston/connecting rod assemblies (not shown), one corresponding to each engine cylinder. Engine 20 also includes intake air heating arrangement 28 and carburetor heating arrangement 30, which are discussed in detail below.

Engine cover or shroud 32 is connected to crankcase 22, and covers at least a portion of each of crankcase 22 and cylinders 24. Shroud 32 may be formed of metal, or from an injection molded or vacuum-formed plastic material, for example. Cylinder wraps 34, typically made of a relatively thin sheet metal, are also connected to crankcase 22 and cylinders 24, and closely surround cylinders 24 for directing cooling air around cylinders 24 as discussed below. Fuel tank 36 is mounted via brackets 38 to the upper ends of cylinder wraps 34. Air inlet screen 40 is mounted to shroud 32, and covers an opening in shroud 32 through which intake air is drawn during running of engine 20 by rotation of flywheel/blower 42 (FIG. 5), which is attached to an end of crankshaft 26 which extends externally of crankcase 22, and includes a plurality of fins 43. Specifically, rotation of flywheel/blower 42 draws intake air through louvers 44 in air inlet screen 40 and into an area defined between crankcase 22 and shroud 32.

Figure 2:
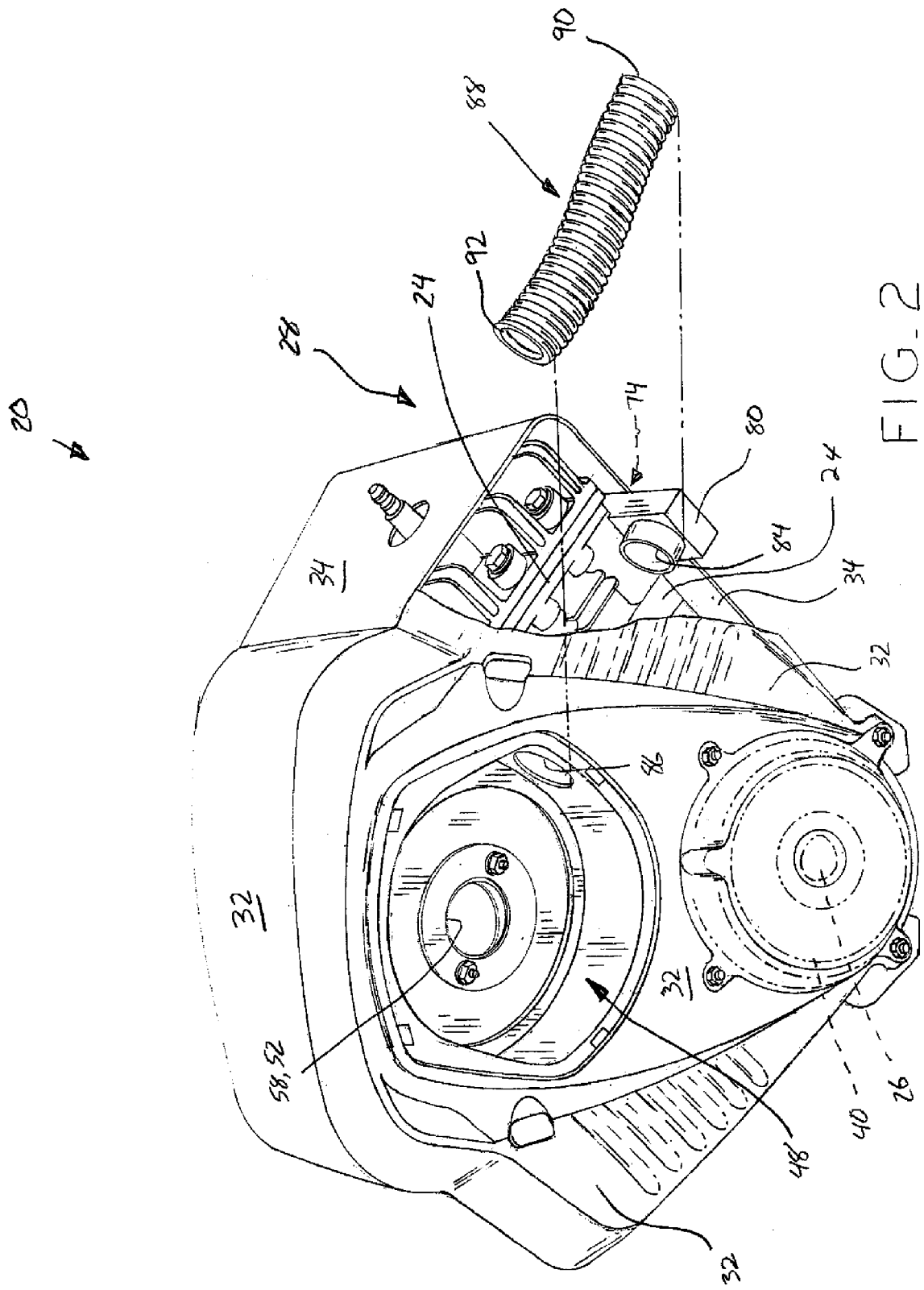
FIG. 2 is a perspective cut-away view of a front portion of the engine of FIG. 1, showing the heater box, conduit, and air cleaner cavity of the intake air heating arrangement.
Figure 5:
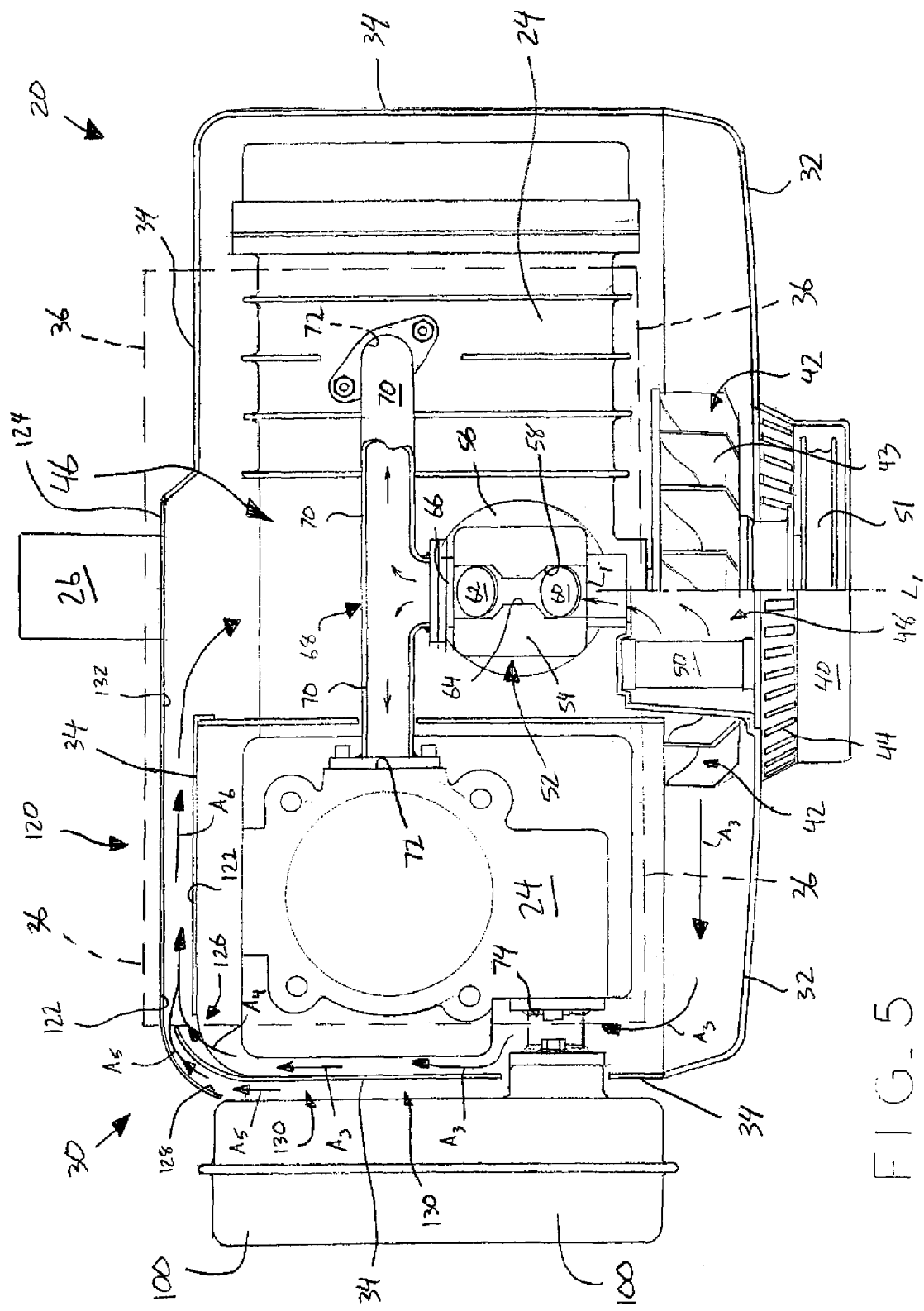
FIG. 5 is a top schematic view of the engine of FIG. 1, looking directly down one of the cylinders, showing the carburetor heating arrangement in accordance with the present invention, wherein a portion of the air cleaner cavity is shown to the left of line $L_1$-$L_1$, and is disposed above the flywheel/blower of the engine.

Referring to FIGS. 2 and 5, cylinders 24 are disposed at an angle with respect to one another to define V-space 46 therebetween. Typically, cylinders 24 are disposed at a 90° angle with respect to one another. Shroud 32 closes the front side of V-space between cylinders 24, and includes air cleaner cavity 48 which optionally includes an air cleaner element 50 therein. Further details regarding intake air cleaner cavity 48 and air cleaner element 50 are discussed in U.S. patent application Ser. No. 10/408,882, entitled AIR CLEANER ASSEMBLY FOR INTERNAL COMBUSTION ENGINES, filed on Apr. 8, 2003, assigned to the assignee of the present invention, the disclosure of which is expressly incorporated herein by reference.

In FIG. 5, engine 20 is shown from a top view, with engine 20 rotated clockwise about 45° such that the left cylinder 24 in FIG. 5 is disposed vertically and the right cylinder in FIG. 5 is disposed horizontally. A portion of air cleaner cavity 48 and air cleaner element 50 are shown to the left of line $L_1$-$L_1$ of FIG. 5, which are disposed above flywheel/blower 42 and air inlet screen 40. To the right of line $L_1$-$L_1$ in FIG. 5, air cleaner cavity 48 and air cleaner element 50 are omitted and flywheel/blower 42 is shown, which is disposed beneath air cleaner cavity 48 and air cleaner element 50, and a portion of air inlet screen 40 is cut away to show pulley 51 of the recoil starter assembly of engine 20.

As shown in FIG. 5, carburetor 52 is disposed within V-space 46. Carburetor 52 is connected to shroud 32 and includes carburetor body 54 and fuel bowl 56. Throat 58 is disposed through carburetor body 54 and includes an inlet end in communication with air cleaner cavity 48. Choke valve 60 and throttle valve 62 are rotatably disposed within throat 58 of carburetor 52 on opposite sides of venturi region 64 of throat 58. Fuel bowl 56 includes a quantity of fuel which is drawn upwardly into throat 58 during running of engine 20 for mixing with intake air at venturi region 64. Outlet end 66 of carburetor 52 is connected to intake manifold 68, which includes a pair of intake pipes 70, each connected to a respective intake port 72 of cylinders 24. Intake manifold 68, intake pipes 70, and intake ports 72 of cylinders 24 are all disposed within V-space 46. Although engine 20 is described herein as including a carburetor 52, the intake air heating arrangement of the present invention could also be used to heat the intake air of an engine which includes a fuel injection system.

Exhaust ports 74 of cylinders 24 are disposed on a side of cylinders 24 opposite intake ports 72, and face outwardly of V-space 46. Thus, heat from exhaust ports 74 is readily dispersed outwardly of engine 20 to the sides of engine 20.

Figure 3:
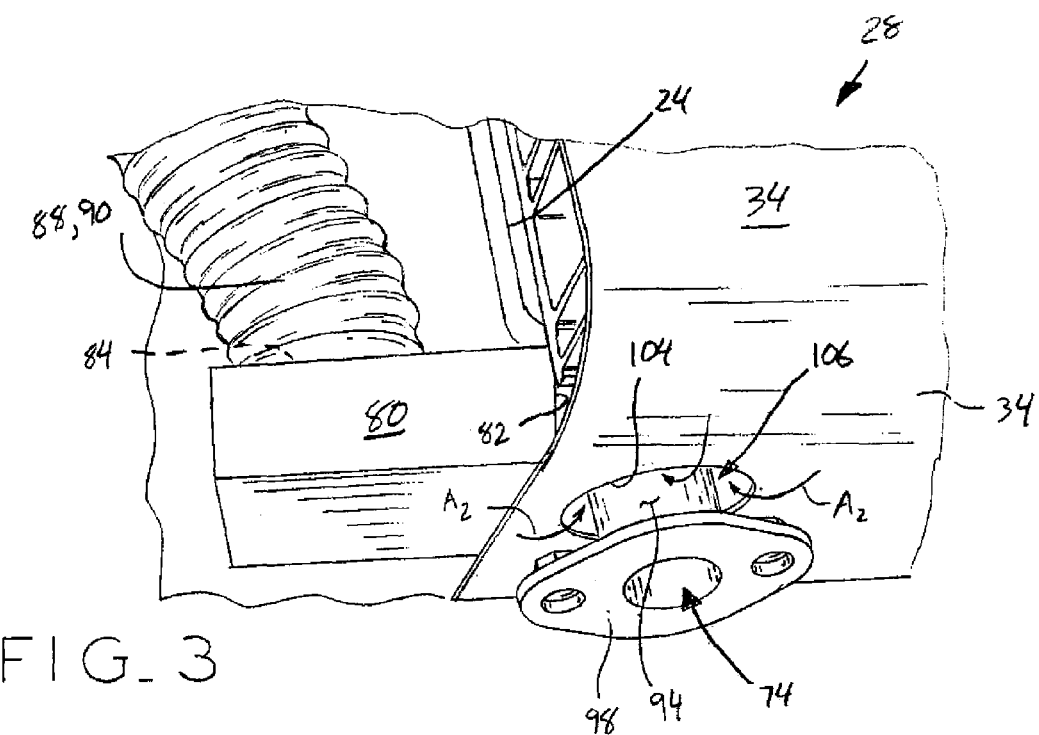
FIG. 3 is a fragmentary perspective view of an outside portion of one of the engine cylinders, showing the exhaust port, and the heater box of the intake air heating arrangement.
Figure 4:
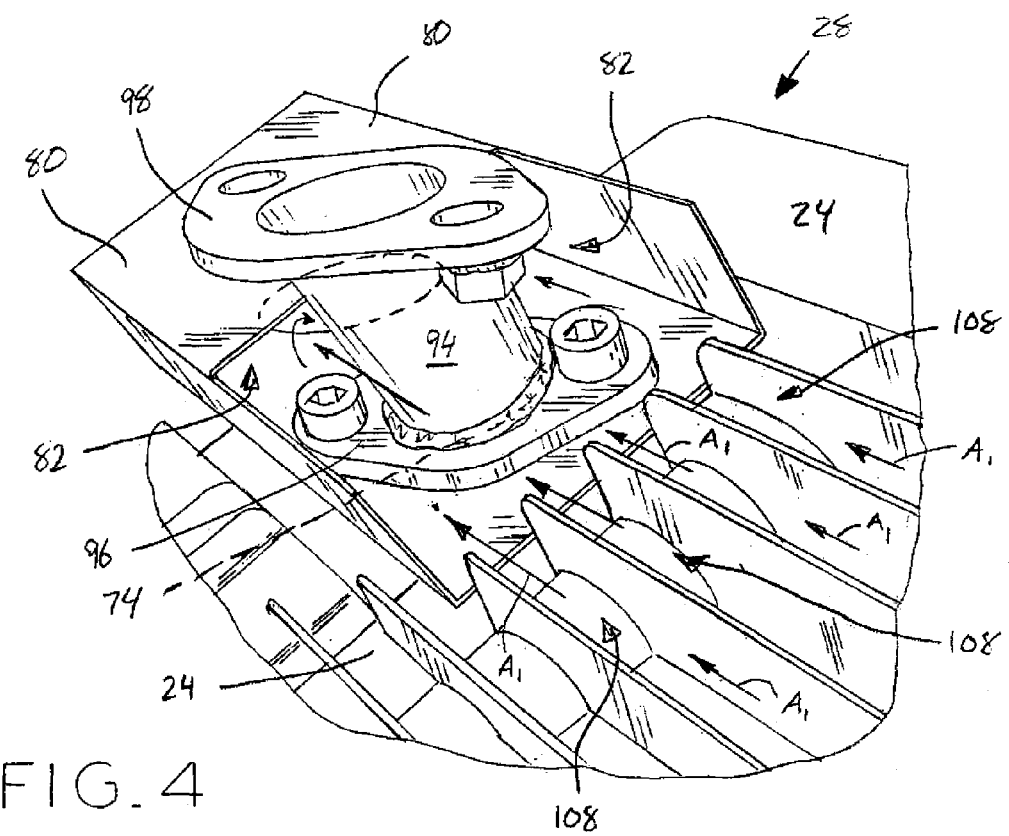
FIG. 4 is a fragmentary perspective view of an outside portion of one of the engine cylinders, shown with the cylinder wrap removed.

Referring to FIGS. 2-4, intake air heating arrangement 28 will now be described. Heater box 80 is connected to one of cylinders 24 proximate exhaust port 74 of the cylinder 24. Heater box 80 may be formed of a suitable metal, such as sheet metal or stainless steel, for example. Heater box 80 generally includes inlet 82 (FIGS. 3 and 4), and outlet 84 which is shown in FIG. 2 in the form of a cylindrical coupling.

Air cleaner cavity 48 of shroud 32 includes an inlet opening 86 formed in a wall thereof. Inlet opening 86 may be formed as a knock-out portion within the wall of air cleaner cavity 48, in which the knock-out portion is removed from the wall of air cleaner cavity 48 during assembly of engine 20 if engine 20 is to be equipped with air heating arrangement 28. Alternatively, if engine 20 is not to be equipped with air heating arrangement 28, the knock-out portion may be left in place. Conduit 88 includes first end 90 connected to outlet 84 of heater box 80, and second end 92 connected to inlet opening 86 of air cleaner cavity 48 to thereby fluidly communicate heater box 80 with air cleaner cavity 48. Conduit 88 is made of a flexible material such as rubber, which material is also resistant to heat transfer such that conduit 88 is insulated, as discussed further below. Alternatively, the construction of conduit 88 may vary. For example, conduit 88 may be a passage integrally formed within shroud 32, or may take the form of a separate duct piece attached to shroud 32 and defining a passage between the duct member and shroud 32.

Referring to FIGS. 3 and 4, exhaust port 74 of cylinder 24 includes an exhaust pipe/adapter 94 mounted to exhaust port 74 by suitable fasteners 95. As is clearly shown in FIG. 4, adapter 94 includes first flange 96 mounted to exhaust port 74 of cylinder 24 via fasteners 95 with a wall of heater box 80 secured between flange 96 and exhaust port 74, and an opposite second flange 98 to which muffler 100 (FIGS. 1 and 5) may be attached. Cylinder wrap 34 surrounds cylinder 24 and is positioned closely adjacent cooling fins 102 of cylinder 24. In FIG. 4, cylinder wrap 34 has been removed for clarity. Referring to FIG. 3, cylinder wrap 34 includes an opening 104 through which exhaust outlet adapter 94 extends, with opening 104 having a larger diameter than exhaust outlet adapter 94 to define a gap 106 between opening 104 and exhaust outlet adapter 94.

As shown in FIGS. 3 and 4, the space between cylinder wrap 34 and the outer wall of cylinder 24 defines an air passage 108, through which air is directed by the rotating of flywheel/blower 42 during running of engine 20. Air passes along arrows $A_1$ through air passage 108, where same is heated by radiant heat from cylinder 24 and from exhaust port 74 and adapter 94 before entering inlet 82 of heater box 80. Additionally, as shown in FIG. 3, air is drawn by the passage of air along arrows $A_1$ in the direction of arrows $A_2$ from externally of engine 20 through gap 106 between opening 104 in cylinder wrap 34 and exhaust port adapter 94. The air corresponding to arrows $A_2$ is heated from exhaust port adapter 94 and muffler 100 before entering inlet 82 of heater box 80. In this manner, heated air enters heater box 80 from the foregoing two sources along arrows $A_1$ and $A_2$. Further, heater box 80 is itself heated by conduction from cylinder 24 during running of engine 20, such that air within heater box 80 is further heated.

Referring to FIG. 2, air within heater box 80 passes through conduit 88 into air cleaner cavity 48. Conduit 88 is made of an insulating material to prevent loss of heat from the air therewithin to the outside of engine 20, such that the air within conduit 88 retains its heat as same passes from heater box 80 into air cleaner cavity 48. Heated air within air cleaner cavity 48 then passes through filter element 50 (FIG. 5) to remove particulate matter from the air. Alternatively, air cleaner cavity 48 may lack filter element 50. The heated air thereafter passes into the inlet end of carburetor 52, as shown in FIG. 5, for mixing with fuel at venturi region 64 of throat 58 to provide an air/fuel mixture for combustion within engine 20. In this manner, the intake air of engine 20 is heated before same enters carburetor 52, preventing "freeze-up" of carburetor 52. Also, if desired, engine 20 may include a pair of heater boxes 80, one connected to each cylinder 24, and a pair of conduits for directing air from the heater boxes into air cleaner cavity 48.

Referring to FIG. 5, carburetor heating arrangement 30 will now be described. Duct assembly 120 generally includes duct 122, wall 124, and cylinder wrap 34. Wall 124 of duct assembly 120 is connected to both cylinders 24 to substantially enclose the rear side of V-space 46 which is disposed opposite shroud 32. Additionally, fuel tank 36, shown in phantom lines in FIG. 5, is connected via brackets 38, as shown in FIG. 1, to the upper portions of cylinders 24. In this manner, shroud 32, wall 124, and fuel tank 36 cooperate to substantially enclose V-space 46 between cylinders 24, such that airflow into and out of V-space 46 is controlled in the manner set forth below.

Cylinder wrap 34 includes an outlet 126 in the form of a section of cylinder wrap 34 which is separated from the remainder of cylinder wrap 34, and which opens into duct 122. Duct 122 includes a first end 128 in communication with air space 130 between muffler 100 and cylinder wrap 34, and a second end 132 in communication with V-space 46.

In operation, air is directed from flywheel/blower 42 between cylinder wrap 34 and cylinder 24 along arrows $A_3$, and is heated from cylinder 24 A portion of this heated air passes through outlet 126 of cylinder wrap 34 into duct 122 along the direction of arrow $A_4$. The forced passage of air through outlet 126 creates a low pressure area within duct 122 behind outlet 126, i.e., a "venturi" effect, at first end 128 of duct 122, thereby drawing additional heated air from air space 130 through duct 122 along arrow $A_5$. Heated air from air space 130 combines with the heated air passing through outlet 126 of cylinder wrap 34, and this combined heated air passes through duct 122 along arrow $A_6$ to second end 132 of duct 122 and is discharged into V-space 46. In this manner, the substantially enclosed V-space 46 is heated by a continuous input of heated air into V-space. Heating of V-space 46 in turn heats carburetor 52, which is positioned within V-space 46. Heating of carburetor 52 aids in preventing "freeze-up" of carburetor 52 during running of engine 20.

After heating carburetor 52, spent heating air within V-space 46 may exit V-space 46 by passing through openings within V-space 46, such as gaps between fuel tank 36 and shroud 32 or between fuel tank 36 and wall 124 of duct 122, for example. Alternatively, a dedicated duct structure or conduit (not shown) may be used to vent the spent heading air from V-space 46.

Advantageously therefor, intake air preheating arrangement 28, including heater box 80 and conduit 88, supplies heated intake air to carburetor 52, and carburetor heating arrangement 30 heats V-space 46 and carburetor 52 which is positioned within V-space. Each of the foregoing arrangements, used separately or in combination with one another, aids in preventing "freeze-up" of carburetor 52 during running of engine 20 in a cold environment.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An internal combustion engine, comprising:
    a crankcase having a crankshaft rotatably disposed therein;
    a blower driven by said crankshaft to generate an air stream;
    at least one cylinder connected to said crankcase, said cylinder including an exhaust port and an exhaust pipe connected to said exhaust port and communicating with a muffler;
    a carburetor in fluid communication with said cylinder; and
    an intake air heating arrangement, comprising:
        a heater box disposed proximate said cylinder, at least a portion of said heater box secured between said exhaust port and said exhaust pipe, an interior of said heater box in airflow communication with said air stream and with said air intake system, whereby air from said air stream is heated within said heater box and is conducted into said carburetor of said engine;
    further including a cylinder wrap at least partially enclosing said cylinder and said carburetor, said cylinder wrap defining an air passage in airflow communication with the blower so that the blower moves air past the muffler for heating thereby and then to an outside of the carburetor so that the air heats the carburetor.

2. The engine of claim 1, wherein said heater box includes at least one wall formed as a relatively thin metal sheet, said metal sheet secured between said exhaust port and said exhaust pipe.

3. The engine of claim 1, wherein said exhaust pipe includes a mount flange, said mount flange connected to said exhaust port by a least a pair of fasteners with at least a portion of said heater box secured between said mount flange and said exhaust port.

4. The engine of claim 1, wherein said intake air heating arrangement further includes a conduit in airflow communication with said heater box and with said carburetor.

5. The engine of claim 1, further including an air cleaner, said air cleaner connected to said carburetor and in airflow communication with said conduit.

6. The engine of claim 1, wherein the muffler is disposed proximate said heater box, whereby air from said air stream is heated within said heater box by heat from said muffler.

7. The engine of claim 6, wherein said heater box further includes an auxiliary inlet in fluid communication with a space proximate said muffler, and a venturi portion disposed proximate said auxiliary inlet, whereby passage of the air stream through said venturi portion lowers the pressure of the air stream to draw heated air from said space proximate said muffler through said auxiliary inlet and into the air stream.

8. The engine of claim 1, wherein said crankshaft is disposed horizontally.

\* \* \* \* \*